No. 841,563. PATENTED JAN. 15, 1907.
J. NORTHEY.
PULSATING VALVE FOR HYDRAULIC RAMS.
APPLICATION FILED SEPT. 18, 1905.
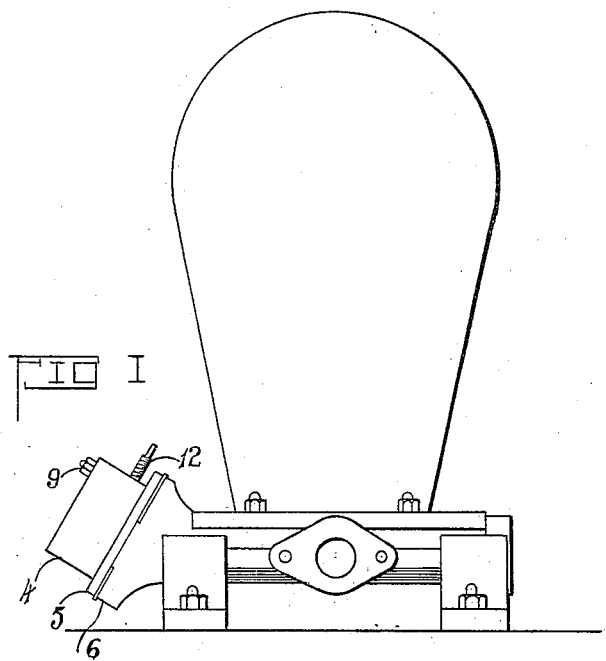
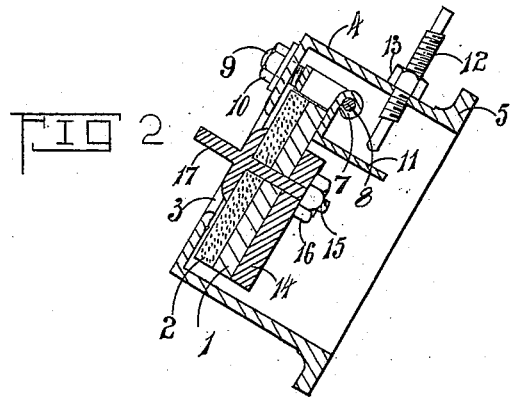
Witnesses.
E. P. O'Donnell
Otis M. Wilton
Inventor.
John Northey.
By his Attorney.
Henriot & Hayward.

UNITED STATES PATENT OFFICE.

JOHN NORTHEY, OF CHRISTCHURCH, NEW ZEALAND.

PULSATING VALVE FOR HYDRAULIC RAMS.

No. 841,563.     Specification of Letters Patent.     Patented Jan. 15, 1907.

Application filed September 18, 1905. Serial No. 278,878.

*To all whom it may concern:*

Be it known that I, JOHN NORTHEY, a subject of His Majesty the King of Great Britain and Ireland, residing at 34 Kilmore street, Christchurch, in the Provincial District of Canterbury, in the Colony of New Zealand, have invented certain new and useful Improvements in Pulsating Valves for Hydraulic Rams, of which the following is a specification.

The invention relates to hydraulic rams; and its object is to provide a pulsating valve which shall be practically noiseless and also to so construct said valve and its casing that it may be readily applied to existing rams.

According hereto I employ a disk valve, which is hinged upon a screwed stud passing through the valve-casing, so that a nut thereon may be removed to enable the valve to be taken out of the casing.

The beat of the valve is preferably of rubber to deaden sound.

The return throw of the valve is regulated by a set-screw passing through the casing and adapted to engage with a tailpiece projecting from the valve. A stud passing through the valve has a projection which extends beyond the casing and is employed to hold the valve up to its seat when it is desired to stop the ram. The valve is arranged at an inclination, with its hinge uppermost, and a balance-weight is employed in the form of a tapering washer or otherwise which overcomes the tendency of the valve to remain closed. The walls of the casing may be regularly cylindrical or curved.

Referring to the accompanying drawings, Figure 1 is a side elevation of a ram with my valve attached, and Fig. 2 is a vertical central sectional elevation of the valve and casing.

The disk valve 1 has the rubber face 2, adapted to close the opening 3 in the casing 4, which has a flange 5, adapted to be connected upon the flange 6 of a hydraulic ram of ordinary construction. The valve has a hinge 7, which is pivoted upon a pin 8, extending laterally from a screwed stud 9, which passes through the valve-casing and is secured in position by a nut 10. The tailpiece 11, extending from the hinge, engages with a stud 12, which is screwed through the casing and secured by a lock-nut 13. A balance-weight 14 is secured to the under side of the valve by a stud 15, which passes through the rubber face, the valve, and the balance-weight and has a nut 16 upon its end. A projection 17 from the stud is used to hold the valve up to its seat when it is desired to stop the ram.

What I claim, and desire to secure by Letters Patent of the United States, is—

A pulsating valve for hydraulic rams comprising in combination, a casing having a discharge-opening, a metal disk valve hinged upon a screwed stud passing through said casing, a rubber face upon said valve adapted to close said opening, a tailpiece projecting from the hinge of the valve, a set-screw passing through the casing adapted to contact with said tailpiece, a balance-weight secured to the under side of the valve, and a stud passing through and securing together the valve the rubber face, and balance-weight and having an extension projecting beyond the casing by which the valve may be held substantially as specified.

In testimony whereof I have signed my name to this specification in the presence of two witnesses.

JOHN NORTHEY.

Witnesses:
     A. H. HART,
     L. ROY SMITH.